US008130668B2

(12) United States Patent (10) Patent No.: US 8,130,668 B2
Agrawal et al. (45) Date of Patent: Mar. 6, 2012

(54) MANAGING DIFFERENCES IN USER DEVICES WHEN SHARING CONTENT ON MOBILE DEVICES

(75) Inventors: Anuraag Agrawal, Bellevue, WA (US); Ed Lambert, Seattle, WA (US); Gerry D'Souza, Kent, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/639,168

(22) Filed: Dec. 16, 2009

(65) Prior Publication Data

US 2010/0146051 A1 Jun. 10, 2010

Related U.S. Application Data

(63) Continuation of application No. 10/821,325, filed on Apr. 9, 2004, now Pat. No. 7,653,001.

(51) Int. Cl.
*H04L 1/00* (2006.01)
*H04M 3/42* (2006.01)
*H04M 1/725* (2006.01)

(52) U.S. Cl. ............... 370/252; 370/401; 455/414.1; 455/412.1

(58) Field of Classification Search ............ 370/252, 370/254, 230, 338, 352, 395.1, 400, 401, 370/431, 465; 455/412.1, 414.1, 418, 419, 455/421, 466; 379/93.24, 93.25, 100.08; 348/207.1, 211.2; 358/440; 709/206, 212, 709/213, 217, 219, 246
See application file for complete search history.

(56) References Cited

U.S. PATENT DOCUMENTS

| | | |
|---|---|---|
| 6,212,550 B1 | 4/2001 | Segur |
| 6,879,997 B1 | 4/2005 | Ketola et al. |
| 6,996,393 B2 | 2/2006 | Pyhälammi et al. |
| 7,062,255 B2 | 6/2006 | Nakanaga |
| 7,116,995 B2 | 10/2006 | Savinen et al. |
| 7,127,232 B2 | 10/2006 | O'Neil et al. |
| 7,165,224 B2 | 1/2007 | Pyhälammi |
| 7,167,710 B2 | 1/2007 | Thakkar et al. |
| 7,200,680 B2 | 4/2007 | Evans et al. |

(Continued)

OTHER PUBLICATIONS

WAP Push Message, "Wireless Application Protocol Push Message Specification", Aug. 16, 1999, WAP Forum, 13 pages.*

(Continued)

*Primary Examiner* — Kwang B Yao
*Assistant Examiner* — Adam Duda
(74) *Attorney, Agent, or Firm* — Woodcock Washburn LLP

(57) ABSTRACT

Sharing content among users of mobile devices is facilitated and controlled by a system and method that employs a content sharing application to receive and process requests to share content amongst users of devices such as mobile devices and personal computers. Recipients receive share content messages from the content sharing application. The messages may contain links to shared content. The content sharing application is associated with an application program interface made available to content providers so that they can create user-selectable share content links or options displayed on display descriptions associated with the content. The content sharing application performs device capability checks so that selected recipients do not receive share content messages that contain links to content that is not compatible with their devices. In this way, users can select to share both device-dependent and device-independent content, even if the content provider does not always perform device compatibility checks.

21 Claims, 14 Drawing Sheets

U.S. PATENT DOCUMENTS

| | | |
|---|---|---|
| 7,295,833 B2 | 11/2007 | Agrawal et al. |
| 7,343,168 B2 | 3/2008 | Valloppillil |
| 7,653,001 B2 | 1/2010 | Agrawal et al. |
| 7,849,135 B2 | 12/2010 | Agrawal et al. |
| 2002/0026500 A1* | 2/2002 | Kanefsky et al. ............ 709/219 |
| 2002/0107982 A1 | 8/2002 | Teodosiu et al. |
| 2003/0045273 A1 | 3/2003 | Pyhälammi et al. |
| 2003/0172121 A1* | 9/2003 | Evans et al. ................... 709/206 |
| 2004/0127251 A1 | 7/2004 | Thakkar et al. |
| 2004/0224662 A1 | 11/2004 | O'Neil et al. |
| 2005/0060411 A1 | 3/2005 | Coulombe et al. |
| 2005/0198109 A1 | 9/2005 | Teodosiu et al. |
| 2005/0226166 A1 | 10/2005 | Agrawal et al. |
| 2006/0014490 A1 | 1/2006 | Kopra et al. |
| 2006/0014523 A1 | 1/2006 | Reilly |
| 2007/0027921 A1 | 2/2007 | Alvarado et al. |

OTHER PUBLICATIONS

Fielding et al., "RFC 2616", Jun. 1999, IETF, 165 pages.*
Fielding et al., "RFC 2616", Jun. 1999, http://www.ietf.org/rfc/rfc2616.txt?number=2616; 165 pages.
WAP Push Message, "Wireless Application Protocol Push Message Specification", Aug. 16, 1999, WAP Forum; 13 pages.

* cited by examiner

People's Choice  Monday, September 29, 2003
You are here: My Phone / Browse / Spotlight / People's Choice

People's Choice introduction headline
People's Choice is lorem ipsum dolor sit adit amet. Ut wisi enim ad minim veniam isi, quis nostrud exerci ipsum dolor sit amet. Ut wisi enim ad minim veniam isi, quis.

⊕ Add "People's Choice" to My Page   ⊕ (Share "People's Choice")  — 1302

| top 10 sites | top 10 games |
|---|---|
| Check items and click "Add to My Page", or click an item's name to learn more about it. | Check items and click "Add to My Page", or click an item's name to learn more about it. |
| ☐ 1. List Item | ☐ 1. List Item |
| ☐ 2. List Item | ☐ 2. List Item |
| ☐ 3. List Item | ☐ 3. List Item |
| ☐ 4. List Item | ☐ 4. List Item |
| ☐ 5. List Item | ☐ 5. List Item |
| ☐ 6. List Item | ☐ 6. List Item |
| ☐ 7. List Item | ☐ 7. List Item |
| ☐ 8. List Item | ☐ 8. List Item |
| ☐ 9. List Item | ☐ 9. List Item |
| ☐ 10. List Item | ☐ 10. List Item |
| ⊕ Add to My Page | ⊕ Add to My Page |

| top 10 tones | top 10 pictures |
|---|---|
| Click here to visit our ring tone library. | Click here to visit our picture library. |
| 1. Gracias Amor | 1. Picture Name |
| 2. Hey Ya! | 2. Picture Name |
| 3. Jamas Te Dejare | 3. Picture Name |
| 4. La Horas Pasan | 4. Picture Name |
| 5. Me Estoy Enamorando | 5. Picture Name |
| 6. My Name Is | 6. Picture Name |
| 7. Pick Up The Phone | 7. Picture Name |
| 8. Simplemente | 8. Picture Name |
| 9. Stand Up | 9. Picture Name |
| 10. Te Accordares De Mi | 10. Picture Name |

*FIG. 13*

MANAGING DIFFERENCES IN USER DEVICES WHEN SHARING CONTENT ON MOBILE DEVICES

CROSS-REFERENCE TO RELATED APPLICATIONS

This application is a continuation of and claims priority to U.S. patent application Ser. No. 10/821,325, now U.S. Pat. No. 7,653,001, filed Apr. 9, 2004, which is hereby incorporated by reference in its entirety. This application is related to the following commonly assigned U.S. Patent Applications: U.S. patent application Ser. No. 10/821,608, now U.S. Pat. No. 7,849,135, filed Apr. 9, 2004, entitled "Sharing Content on Mobile Devices" and U.S. patent application Ser. No. 10/822,187, now U.S. Pat. No. 7,295,833, filed Apr. 9, 2004, entitled "Spam Control for Sharing Content on Mobile Devices," both of which are hereby incorporated by reference in their entirety.

BACKGROUND

Content providers are increasingly offering content to subscribers of mobile wireless services. For example, mobile wireless service providers and others are offering wireless portals through which users of mobile devices can access content such as news, entertainment, and email services—the possibilities for content are endless. In addition, content providers that in the past have tailored their content for users of traditional web browsers are increasingly providing alternative formats for users of mobile devices.

The mobile devices of today, while much advanced, are typically small with limited input capabilities and navigation capabilities. For this reason, content intended for users of such devices is sometimes subject to special formatting and protocols. Another problem content providers struggle with is marketing their content to users of mobile devices. For example, because of the limited input/output capabilities of most wireless devices, it is difficult for the mobile end user to search for and identify new and interesting content. Very often, the best applications or content is made known by "word of mouth." For example, a friend or colleague may recommend a particular mobile application. In doing so, he or she has to remember and describe where the content was found, which may not always be easy or practical.

As mobile devices use a variety of technologies that differ from device to device, another complication involves handling or managing differences in user devices in the context of receiving content on mobile devices. For example, content that is completely compatible with one device (e.g., a Java game that depends on a particular version of a Java Application Manager) may not work at all on another device, resulting in bad and frustrating experiences for many users. While each content provider can implement procedures to detect and handle each device's capabilities, this is not a practical solution, as such procedures are often difficult to implement, and there are a large number of content providers that would need to comply.

BRIEF DESCRIPTION OF THE DRAWINGS

FIG. 13 is a display diagram showing a screen displayed on a more full-size screen of a computer device from which a user may select content to share with users of mobile devices.

Figure 1:
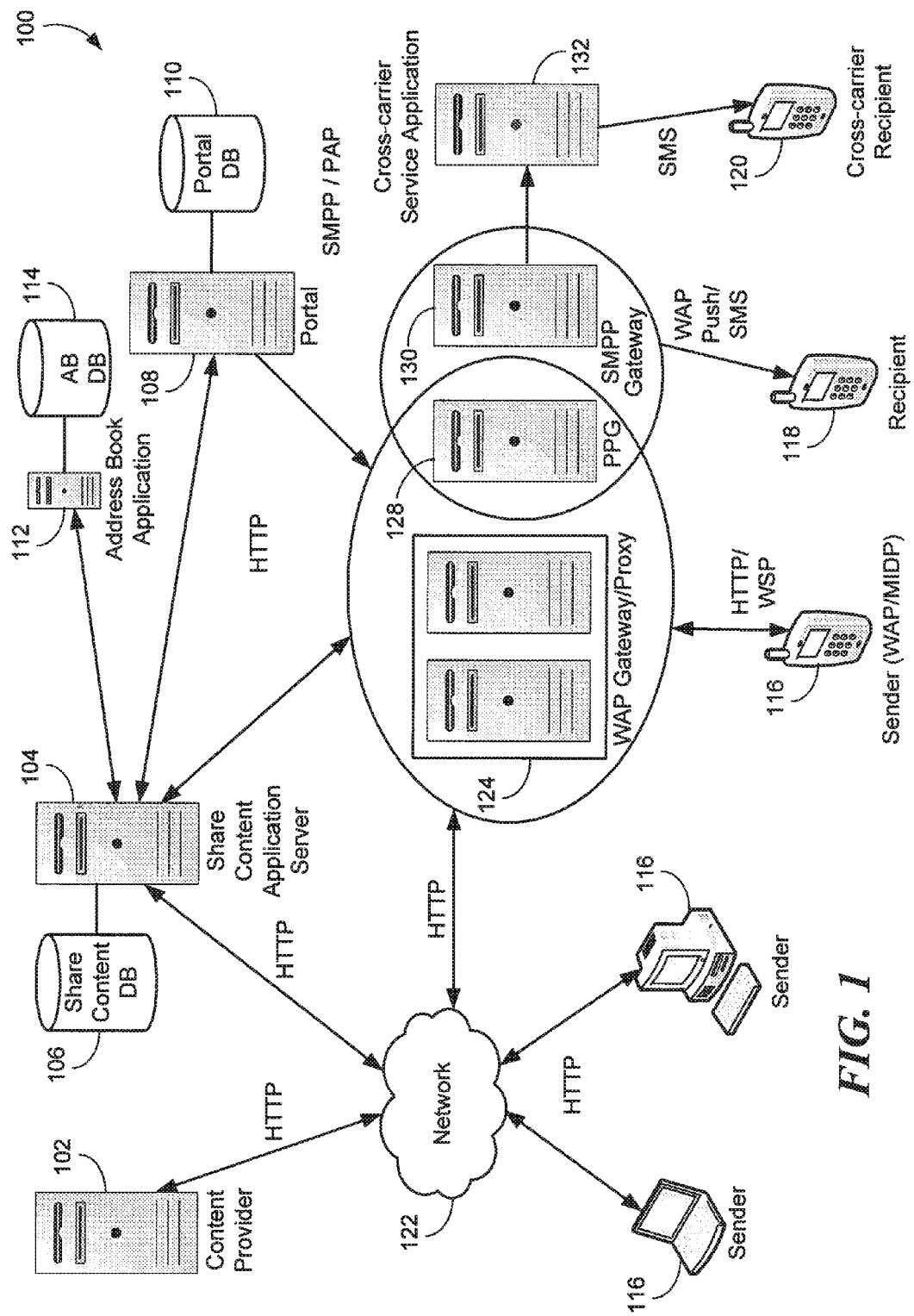
FIG. 1 is a block diagram showing an example of a system for sharing content under one embodiment.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the U.S. Patent and Trademark Office's patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

The method and system described herein allows users of mobile devices to share content with other users via mobile messaging and other similar techniques, while at the same time minimizing the sending and receiving of unwanted share content messages (e.g., spam). In general, and as described more completely in U.S. patent application Ser. No. 10/821, 608, the share content application makes sharing content easy for both users and content providers and helps to overcome difficulties associated with the limited input capabilities of small devices. For example, a user of a mobile device finds interesting content and wants to send it to a friend. The user then selects a share content link on the content page, which is provided by the content provider, who created the share content link based on an application program interface (API). The request to share content is sent to a share content application, which then sends a recipient identification form to the user's device. The user identifies the friend (or friends) by filling out and submitting the recipient identification form. The user's friend (or friends) then receives a content link via a message or alert (e.g., a WAP Push message). The friend can choose to act upon the received message by loading a URL provided in the message, or can ignore it or delete it.

Because not all devices are created equal, some of the considerations involved with sharing content in this way include device compatibility and supporting a good user experience across various devices. For example, when Ann, a user of a brand XYZ mobile phone, shares a link with Bob, a user of a brand YW PDA, the content that Ann selects to share with Bob, may or may not work on Bob's PDA. If the content does not work on Bob's PDA, when Bob attempts to access the content via the share content message he received from Ann, he will be unable to do so and may waste time and effort trying. In general, Bob will have a bad user experience. To avoid such problems and the bad user experiences that go along with them, the share content application and associated API provide a range of functions to handle device differences while easing the burden on content providers.

In some embodiments, the API invites content providers that offer device-dependent content to create share content links using both a specific resource locator parameter (e.g., specific url or surl) and a generic resource locator parameter (e.g., generic url or url). The content provider uses the specific resource locator to identify its device-dependent content (e.g., Java Applets or J2ME MIDP applications) and uses the generic resource locator to identify its device-independent content (e.g., landing pages). In many cases, the content provider that performs its own device capability checks may use the device-independent content as a device compatibility doorway.

Where the share content application receives a share content request including both the specific resource locator parameter and the generic resource locator parameter, the share content application proceeds to analyze the user's device and the recipient's device to determine if there is a compatibility match. Where the devices match, the share content application sends a share content message that allows the recipient to access the content via the specific resource locator. Where the devices do not match, the share content application sends a share content message that allows the recipient to access the content via the generic resource locator. This technique is effective even where the content provider does not perform its own device capability detection, and thereby makes viral marketing of wireless data easy for the content provider.

Content providers may have many options to control what content recipients can access via a share content message, and may use this feature to encourage recipients to purchase or otherwise subscribe to specific versions of content. For example, in some embodiments, content providers can elect to use a generic url by default in all share content messages. When the recipient accesses the content via the generic url, the recipient can then view options to access more specific content (e.g., streaming video, a game, music, etc.), provided that the recipient pays an extra fee, registers on a web site, provides information, etc. Likewise, by accessing generic content via a share content message, the recipient may become aware that, by obtaining a more capable device, he or she would have the option to access more specific (and desirable) content. Accordingly, via share content messages, recipients may also be encouraged to upgrade their current devices (either by purchasing new devices or downloading new applications to existing devices).

II. Representative System

FIG. 1 and the following discussion provide a brief, general description of a suitable environment in which the invention can be implemented. Although not required, aspects of the invention are described in the general context of computer-executable instructions, such as routines executed by a general purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multiprocessor systems, microprocessor-based or programmable consumer electronics, set-top boxes, network PCs, mini-computers, mainframe computers, and the like. Indeed, the terms "computer," "host," and "host computer" are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, such as a microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a system 100 on which the content sharing scheme can be implemented provides various networked components. These components include one or more content providers 102, a share content application 104 and database 106, a wireless portal 108 and database 110, and, optionally, an address book application 112 and database 114. The system 100 also includes various end user components, including content sender devices 116 (e.g., mobile device, laptop, PC, etc., with browser), content recipient devices 118 (e.g., WAP-enabled mobile device, SMS-enabled mobile device, etc.), and cross-carrier recipient devices 120. Details regarding the features of the components of FIG. 1 are described in detail below.

These various components communicate via one or more networks 122. For example, the system 100 may include a wireless network. Examples of wireless telecommunication networks include UMTS (universal mobile telecommunication system), GSM (global system for mobile communications) (possibly including GPRS (general packet radio service), EDGE (enhanced data rates for GSM evolution), etc.), CDMA (code division multiple access), IS-136, analog, etc. The system may also include various wired or partially wired networks, such as the Internet, a wired LAN (local area network), or even a public switched telephone network (PSTN). While not all types of networks are described herein, the invention may be implemented within the framework of many types of networks.

In some embodiments, the share content application 104, along with the various gateway components, is configured to communicate within more than one of the above described communication networks. For example, users may access the share content application 104 from a personal computer or laptop via a wired or partially wired public communication network (i.e., the Internet). It can also be accessed via a telecommunication network, such as one of the wireless or wired networks described above.

To facilitate and manage network communications, the system 100 may include various communication gateways and related applications. For example, the share content application 104 and the content sender devices 116 communicate via a WAP gateway/proxy 124, and a push proxy gateway 128. Content recipient devices 118 may receive WAP Push messages via the push proxy gateway 128 and a short message peer-to-peer gateway 130. Cross-carrier content recipient devices 120 may receive messages via a short message peer-to-peer gateway 130 used in conjunction with a cross-carrier service application 132. In general, any "cross-carrier" component refers to a component operated by a telecommunications carrier that differs from a telecommunications carrier operating the other components of FIG. 1. In addition, the cross-carrier service application 132 may provide the share content application 104 with information to conduct device compatibility checks.

Via this combination of networks and gateways, the share content application 104 may establish communication links on many different types of networks, with many different types of devices, including cross-carrier devices. In some embodiments, the share content application 104 runs on, or in association with, the system of a wireless service provider or wireless carrier. Accordingly, many of its capabilities may be based on information associated with its subscribers (customers). Some of these capabilities include tracking share content requests made by users.

Figure 2:
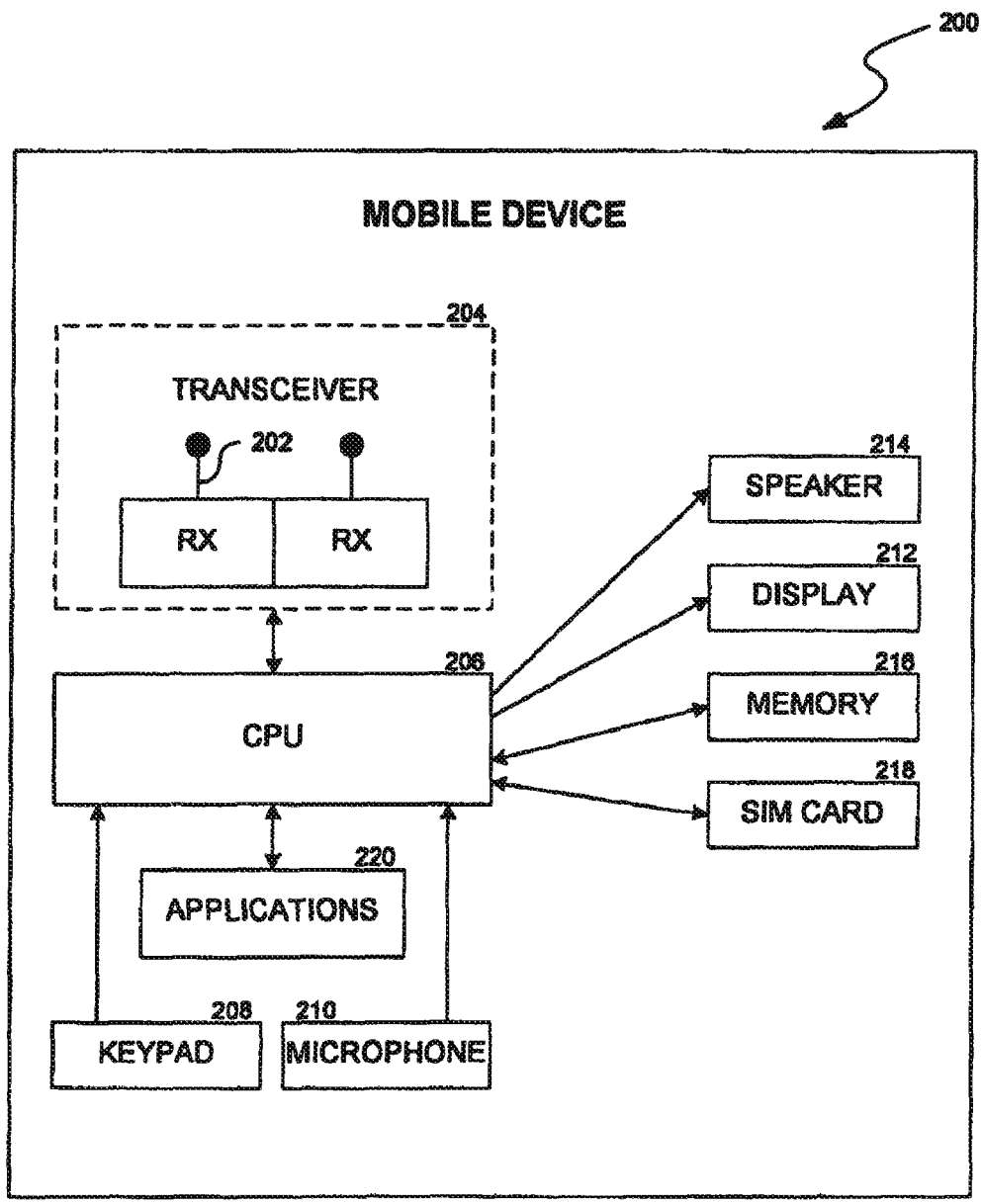
FIG. 2 is a block diagram showing an example implementation of the mobile devices of FIG. 1.

FIG. 2 shows a block diagram of a typical mobile communication device 200, such as a mobile handset. This device is representative of both the content sender device 116 and content recipient devices (118 and 120) of FIG. 1. While a mobile phone is shown as the mobile communication device in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile device 200 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A customer may provide input to the processor unit 206 via a keypad 208, microphone 210, or display/touchpad 212. In turn, the processor unit 206 may provide information to the customer via the display/touchpad 212 or a speaker 214.

The processor unit 206 may access information from, and store information in, a nonremovable memory 216 or a removable memory 218. The nonremovable memory 216 may consist of RAM, ROM, a hard disk, or other well-known memory storage technologies. The removable memory 218 may consist of Subscriber Identity Module (SIM) cards, which are well known in GSM communication systems, or other well-known memory storage technologies, such as "smart cards." Applications 220 such as wireless content browser applications and address book applications could be implemented in either the removable memory 218 or the nonremovable memory 216.

III. Application Program Interface and Platforms

In some embodiments, the share content application may be associated with an API (application program interface) that allows content providers to easily create "links" or other functionality that facilitates sharing of content and applications. In some embodiments, share links may be placed within the content itself, or be somehow otherwise available through the content or application. Such links may be in the form of an HTTP GET request, which may use a URL or another indication (e.g., application name, url, specific url, return url, etc.) to the share content application. An example of such a request is as follows:

```
http://wireless<dot>mobile<dot>wirelesscarrier<dot>net/
p2p?msisdn=2065551212&app_name=CoolGame&app_url=
http://www<dot>coolgame<dot>com/coolgame.wml&return_url=
http://www<dot>coolgame<dot>com
```

In the above example of an HTTP GET request, the request is in the form of a URL that begins with an indication of the protocol in use ("http") followed by the host name "wireless<dot>mobile<dot>wirelesscarrier<dot>net" followed by the "p2p" path name. The information provided following the "?" are the parameters of the GET request. In the above example, this information includes the MSISDN of the content sender device (2065551212) and the application name (name for the content, "Cool Game"), the application url (www<dot>coolgame<dot>com/coolgame.wml), and a return URL (www<dot>coolgame<dot>com). The application url takes the friend or recipient to content upon receipt of the message, while the return url takes the user back to the content after the share content request process is complete. The application url and the return url may be the same or different. For example, if a content provider wants to route all new visitors to a home page, the application url may be the home page, whereas the return url may be the page from which the user selected the share content link. In the above example, the information passed in the GET request may be configured statically, with only the MSISDN added at run time. Depending on the technique used for sharing the information, other information can be added to the GET request at run time, such as the sender's name/message, the friend's MSISDN, etc. Some of the parameters that can be passed in a GET request are described in more detail in Table 1 below.

TABLE 1

| Parameter | Description |
|---|---|
| url | The URL of the content that is being shared. This is also the generic URL in case the surl is specified. In some embodiments, this parameter is needed when surl is not specified. |
| surl | The specific URL of the content that is being shared. The friend receives the surl in the push message when the friend's device belongs to the user's device class. If this parameter is not specified irrespective of the device of recipient, url is shared. |
| title | Title of the content to be shared. |
| returnurl | The URL to which the sender is returned after the user is done sharing the content. When returnurl is not specified, surl is used. When surl and returnurl are not specified, the value of url is used to return the user. |
| cc | Indicates whether the content provider is interested in sending the SMS message to a cross-carrier friend of the user. If this value is set to "y" an SMS message is sent to cross-carrier friends with the value for url in the message. A missing cc parameter or any other value other than "y" would mean this URL will not be shared with the cross-carrier friend. |

IV. System Flows

FIGS. 3 through 9 are representative flow diagrams that show processes that occur within the system of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

Figure 3:
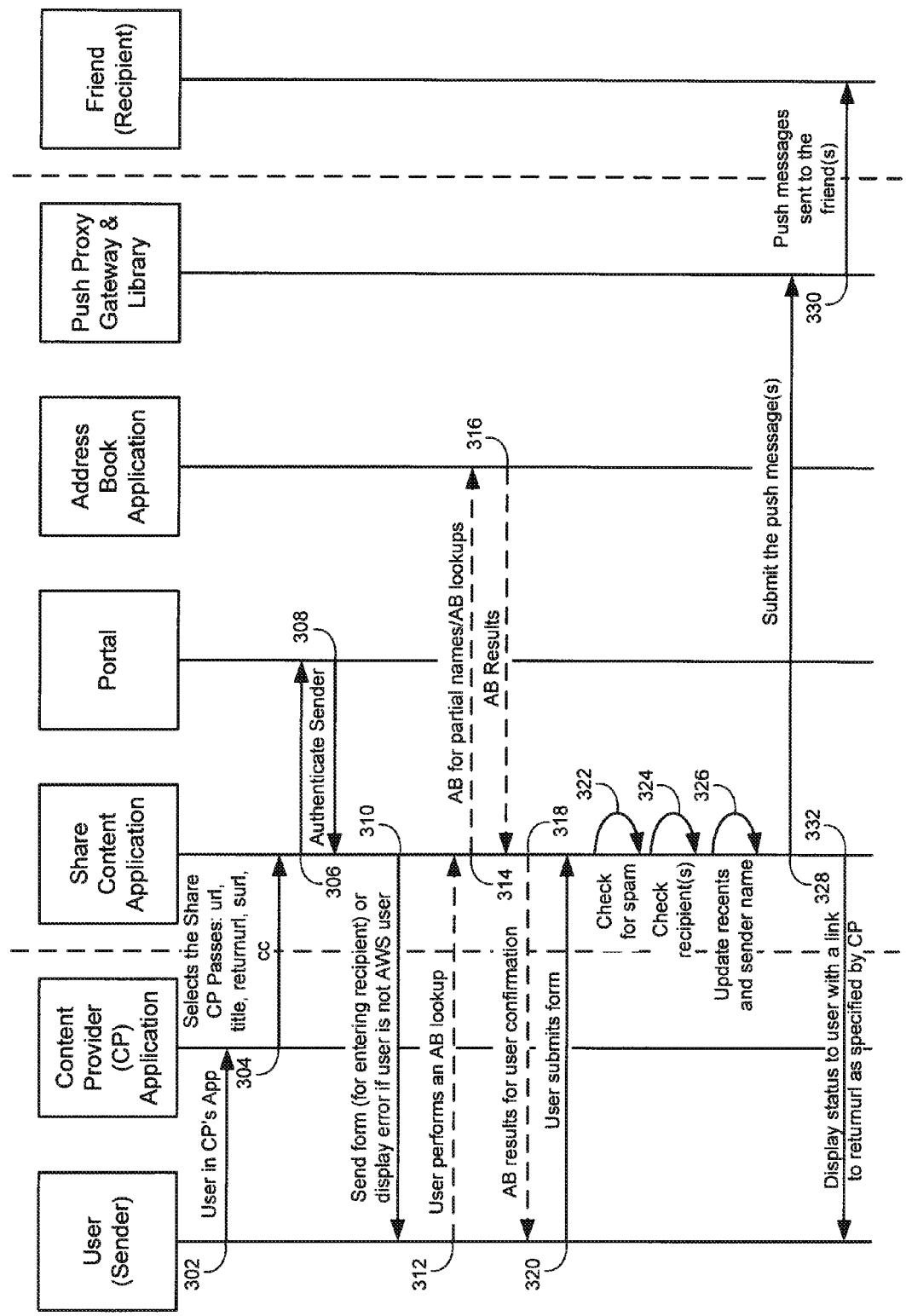
FIG. 3 is a flow diagram showing a high-level transaction flow between various components of the system of FIG. 1.
Figure 4:
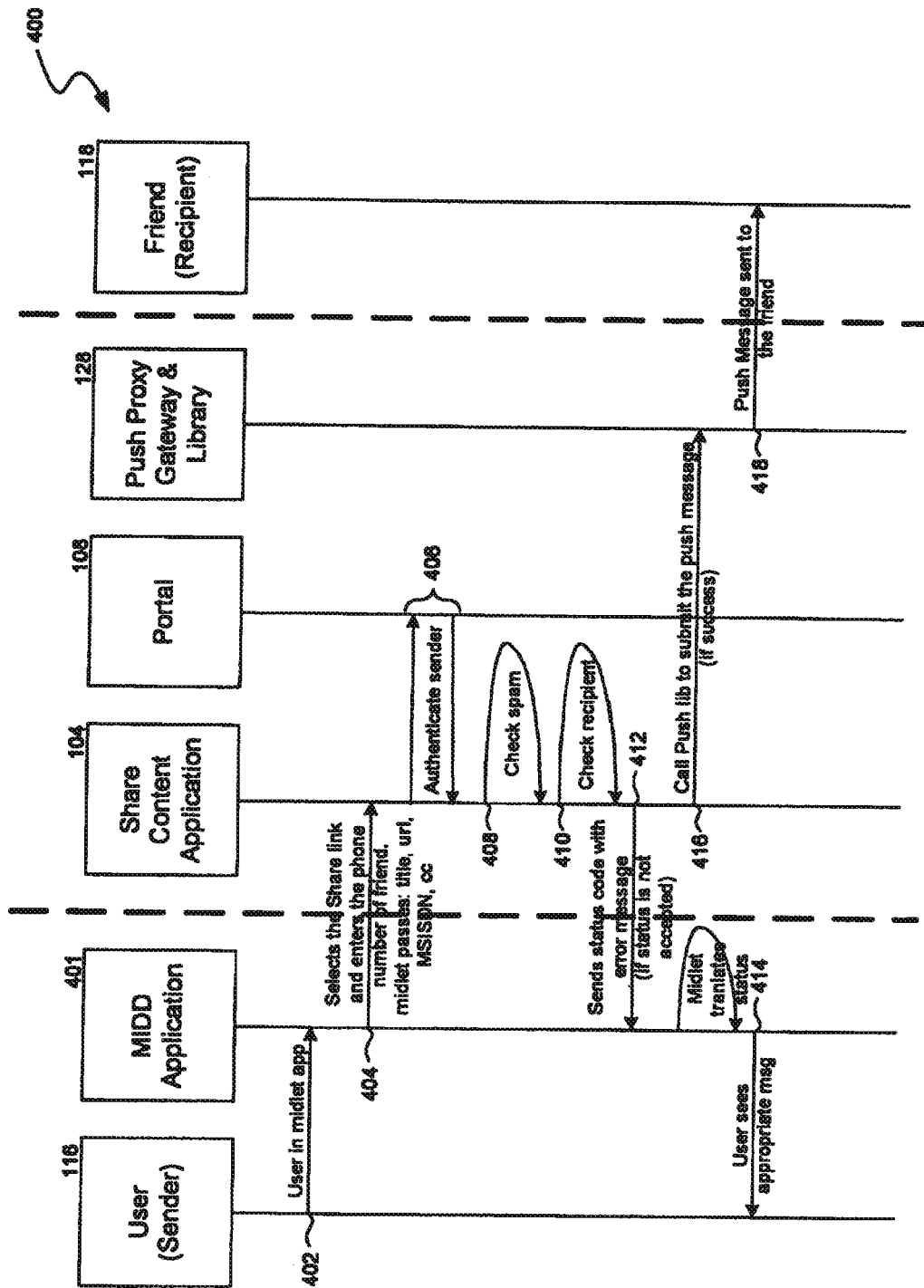
FIG. 4 is a flow diagram showing an alternative high-level transaction flow between various components of the system of FIG. 1 involving an MIDP application user.

The flows represented in FIGS. 3 and 4 are high-level flows in which the entire transaction is shown from initiation to completion. Some of the individual processes or subtransactions are described in more detail in the Figures that follow. The various entities that may be involved in the transaction are also depicted in FIG. 1 and include the content sender device 116, the content provider 102, the share content application 104, the wireless portal 108, the address book application 112, various components of the push proxy gateway 128, and the content recipient device 118.

Referring to FIG. 3, a share content transaction 300 for WAP-enabled devices is shown from initiation to completion. At a subtransaction 302 a user of the content sender device 116 selects to share content provided by the content provider 102. At a subtransaction 304 the share content application 104 receives various parameters associated with the content to be shared. The types of information that may be included as parameters are described in more detail above in the section entitled "Application Program Interface and Platforms." In some embodiments, the parameters are sent in the form of an HTTP GET request that is created by the content provider 102 and accessed by the user of the content sender device 116 as a hyperlink on a content page. At a subtransaction 306, the share content application 104 receives the share content request and authenticates the user of the content sender device 116. In the case where users are selecting to share content from a PC, the portal may provide the appropriate user information so that the share content application 104 can perform this verification subtransaction.

Once the user is authenticated, at a subtransaction 310, the content sender device 116 receives a user input form from the share content application 104. If authentication of the user fails, the user sees an error message on the device instead of the user input form. The user may also see this error message if the content provider 102 fails to provide certain parameters (e.g., url or surl, described below).

At a subtransaction 312, the user performs an optional address book lookup function via the share content application 104. At a subtransaction 314, the share content application 104 may optionally invoke the address book application 112, which, at a subtransaction 316, performs a query of the address book (AB) database 114 and provides results to the share content application 104. At a subtransaction 318, the share content application 104 sends results of the address book lookup to the content sender device so it can be displayed to the user and the user can select or enter the appropriate entries.

After the user has completed the input form, at a subtransaction 320, the content sender device 116 submits the completed form to the share content application 104. At a subtransaction 322, the share content application 104 may check for spam, a process that is described in more detail in U.S. patent application Ser. No. 10/822,187, now U.S. Pat. No. 7,295,833. At a subtransaction 324, the share content application 104 checks the recipient status to determine whether each specified content recipient device 118 subscribes to a service associated with the share content application 104 or is a cross-carrier recipient, a process that is described in more detail with respect to FIGS. 6 and 8. At this transaction, the share content application 104 may also check for information about the recipient devices to determine whether they may be compatible with the content or applications to be shared, a process that is described in more detail with respect to FIGS. 6 and 7.

At a subtransaction 326, a "recents" list may be updated with the latest recipient information. This list may be stored at the share content application 104 and may include a list of names or MSISDNs (mobile station ISDN number) most recently contacted by the user.

At a subtransaction 328, the share content application 104 communicates with various components of the push proxy gateway 128 to establish a WAP Push message for each of the eligible content recipient devices 118. In some embodiments, a single push proxy gateway address will resolve users on all available gateways available in the network. At a subtransaction 330, the WAP Push message(s) are sent to the content recipient device(s) 118. In this way, the user of a content recipient device 118 is directed to the content (e.g., a URL). At a subtransaction 332, the share content application 104 sends a status page to the content sender device 116. This may include return URL information so that the user can automatically be taken back to the content that he or she originally selected for sharing, a process that is described in more detail with respect to FIG. 9.

A slightly different high-level flow may occur when the system handles content including J2ME (Java 2 platform micro edition) applications (i.e., MIDP (mobile information device profile)) and similar applications that do not typically launch browsers. In such cases, the share content application 104 may perform code-injections. If the share content application 104 is not configured to perform code-injections, the system may alternatively rely on a MIDP application 401 (e.g., MIDlet) to capture the content recipient device's address information and submit it to the share content application 104, as illustrated in a transaction flow 400 of FIG. 4.

Referring to FIG. 4, in a subtransaction 402, the MIDP application 401 manages the display of the user input form. At a subtransaction 404, the MIDP application 401 passes information from the input form (e.g., the content recipient's MSISDN) to the share content application 104. At a subtransaction 406, the share content application 104 performs authentication of the user associated with the content sender device 116. This may occur via subtransactions with the wireless portal 108.

At a subtransaction 408, the share content application 104 may check for spam. This may include checking to see if the user associated with the content sender device has exceeded a threshold for sending messages. At a subtransaction 410, the share content application 104 checks the recipient status to determine whether each specified content recipient device 118 subscribes to a service associated with the share content application 104 or is a cross-carrier recipient. At subtransaction 412, the share content application 104 sends a status code to the MIDP application 401, indicating the status of the checks performed at the share content application 104. At subtransaction 414, the MIDP application 401 may pass this information on as a message to the content sender device 116. Meanwhile, the share content application 104 at subtransaction 416 communicates with various components of the push proxy gateway 128 to establish a WAP Push message for each of the eligible content recipient devices 118. At a subtransaction 418, the WAP Push message(s) are sent to the content recipient device(s) 118.

Figure 5:
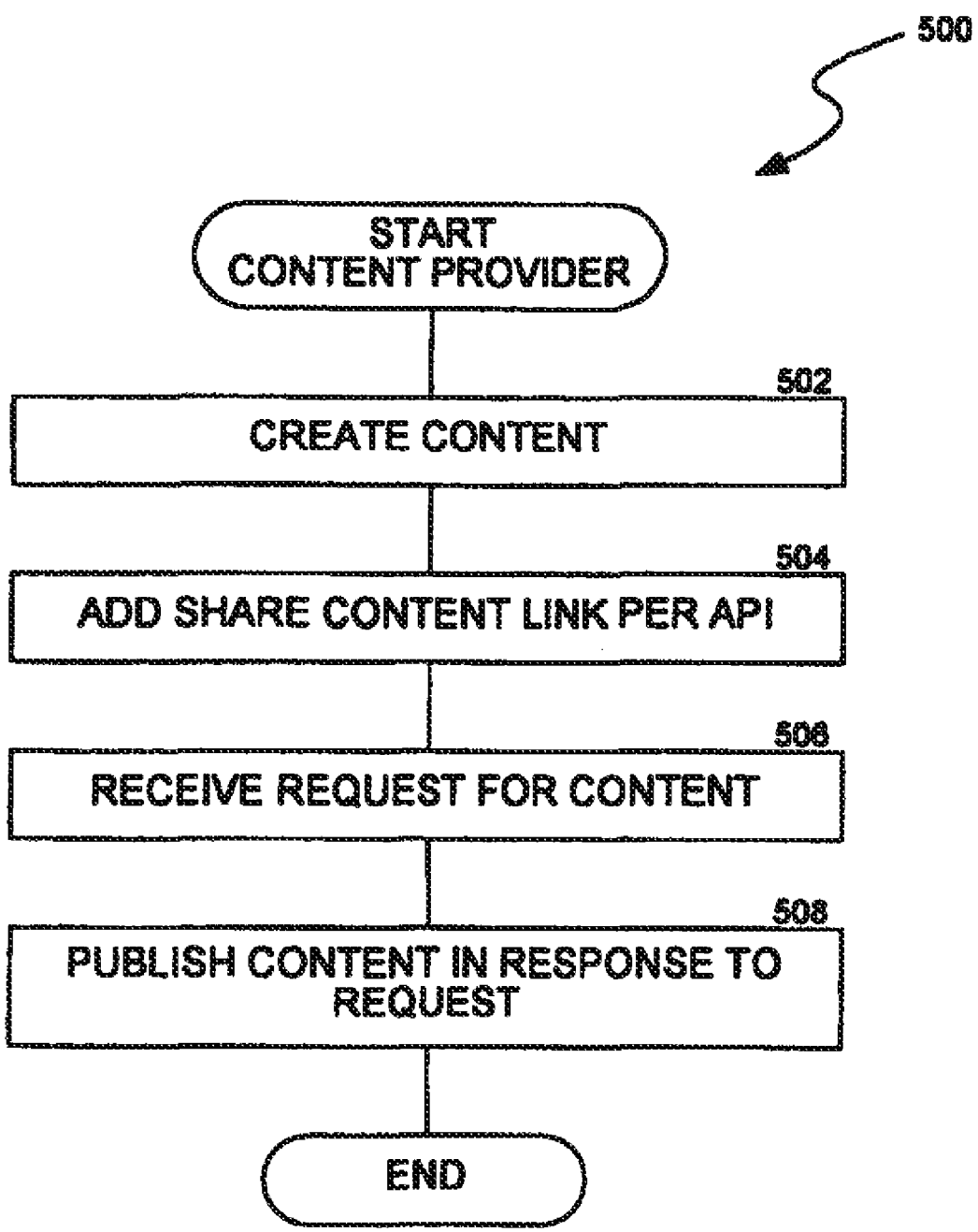
FIG. 5 is a flow diagram showing a routine for implementing the content sharing technique, where the routine is performed at the content provider of FIG. 1.

Referring to FIG. 5, a process 500 performed at the content provider 102 begins at block 502 where the content provider creates content, which may be compatible with one or more device types.

At block 504, the content provider adds a share content link to the content. The share content link is created using an API (application program interface) recognized by the content sharing application, described in more detail below. In some embodiments, the content provider may provide the link at the bottom of a display page, such as a page provided via the Internet or via a wireless portal. The link may include a specific url parameter (e.g., surl) and, optionally, a generic url parameter. While the provided specific url may relate to a portion of the content provider's content that is device dependent (e.g., a Java Applet or a J2ME MIDP application), the generic url relates to a portion of the content provider's content that is configured to be device independent (e.g., a landing page), and that may, in some cases, be the device compatibility doorway for the content, as most content providers that perform device capability checks do so only at their landing page or first page.

The use of both the specific resource locator parameter and the generic resource locator parameter can help ensure that the recipient receives the content most suited for his or her device. For example, if a recipient's device is configured to play streaming video, that recipient would benefit most from a share content link that contains a specific url for a video streaming version of the content. If however, the recipient's device is not configured to play streaming video, the recipient may still be able to access the content via a generic url that ultimately allows the user to at least view the images. In another example associated with gaming, if a user downloads a game from a gaming arcade and then wants to share it with two friends, the share content message that each of the friends receives may depend on whether the friends' devices are compatible with user's device. For example, the friend that has the same phone as the user will receive a share content message containing a specific url for the game. However, the second friend, who has an incompatible device will receive a share content message containing a generic url for the gaming arcade.

At block 506 the content provider receives a request for content from a user, such as the user of the content sender device 116 of FIG. 1. At block 508, the content provider publishes the content (including the link) in response to the request from the user.

Figure 6:
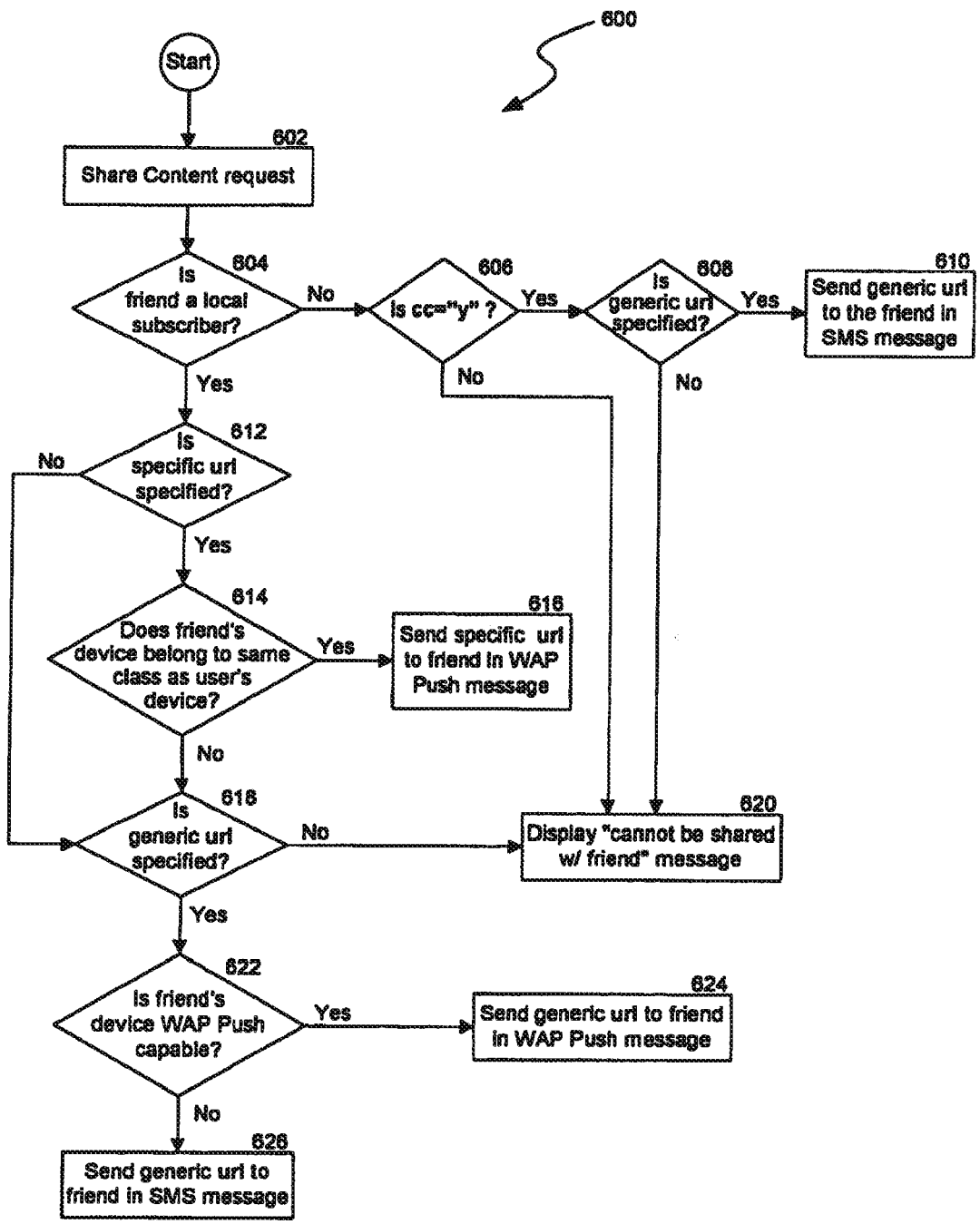
FIG. 6 is a flow diagram showing a routine for handling differences in user devices, as well as parts of a routine for handling cross-carrier recipients.

Referring to FIG. 6, the share content application performs processing on received share content requests via a share content request routine 600. At block 602 the routine 600 receives a share content request from a user. In some embodiments, the share content request may be received in one or more parts (e.g., (1) a message resulting from selecting a share content link on a content providers page, and (2) a recipient information form that has been completed by the user). The share content request may identify one or more recipients with whom the user has selected to share content, and it may also identify aspects of the content to be shared in the form of parameters assembled by the content provider. The following aspects of the routine 600 are performed for each recipient identified in the share content request.

At decision block 604 the routine 600 checks whether the selected recipient is a local subscriber (e.g., subscribes to the wireless service provider (carrier) associated with the share content application) or is a cross-carrier subscriber. If at decision block 604, the selected recipient is a local subscriber, the routine 600 proceeds to decision block 612, where the routine checks if the share content request includes a specific url, or another indication of device-dependent content. If, however, at decision block 604 the recipient is a cross-carrier subscriber, the routine 600 continues at decision block 606.

At decision block 606 the routine 600 checks if the share content request includes a cc parameter set to yes (or true), or another indication of whether the share content message can be shared with recipients having cross-carrier devices. The cc parameter indicates whether the content provider is interested in sending the SMS message to a cross-carrier friend of the user. If this value is set to yes an SMS message, or the like, is sent to cross-carrier friends. A missing cc parameter or any other value other than "y" would mean this URL is not to be shared with the cross-carrier friend. Accordingly, if at decision block 606 the content provider does not allows cross-carrier sharing, the content cannot be shared with the cross-carrier recipient device (block 620), and the routine 600 ends. If, however, at decision block 606 the content provider allows cross-carrier sharing, the routine 600 continues at decision block 608.

At decision block 608 the routine 600 checks if the share content request includes a generic url, or another indication of device-independent content. If at decision block 608 the share content request does not include a generic url or the like, the content is not device-independent and, thus, cannot be shared with the cross-device (block 620) in the illustrated embodiment, and the routine 600 ends. At decision block 608 the share content request includes a generic url or the like, the routine 600 continues at block 610, where the routine sends the generic url to the recipient device in an SMS message form, or another message form. While the example of FIG. 6 may not allow the sharing of device-dependent content with cross-carrier recipients, in other embodiments, such as the embodiment described with respect to FIG. 7, the share content application may support sharing device-dependent content between cross-carrier devices.

At decision block 612 the routine 600 checks if the share content request includes a specific url, or another indication of device-dependent content. If at decision block 612 the share content request includes a specific url or the like, the routine 600 continues at decision block 614. If, however, at decision block 612 the share content request does not include a specific url, the routine 600 skips to decision block 618.

At decision block 614 the routine 600 checks if the user's device and the recipient's device are in a same class of device, or if the devices are otherwise compatible. If at decision block 614 the devices are not in the same class, the routine 600 continues at decision block 618. If, however, at decision block 614 the devices are in the same class, the routine 600 continues at block 616, where the routine sends the specific url to the recipient's device using a WAP Push message, or other compatible message form.

At decision block 618 the routine 600 checks if the share content request includes a generic url, or another indication of device-independent content. If at decision block 618 a generic url or the like is specified, the routine 600 continues at decision block 622. If, however, at decision block 618 a generic url or the like is not specified, the device-dependent content cannot be shared with the noncompatible recipient device (block 620), and the routine 600 ends.

At decision block 622 the routine 600 checks if the recipient's device is WAP Push-compatible. If at decision block 622 the recipient's device is WAP Push-compatible the routine 600 continues at block 624, where the routine 600 sends the generic url to the recipient device in a WAP Push format. If, however, at decision block 622 the recipient's device is not WAP Push-compatible, the routine 600 continues at block 626, where the routine sends the generic url to the recipient device in an SMS message, or other format. The routine 600 then ends.

Figure 7:
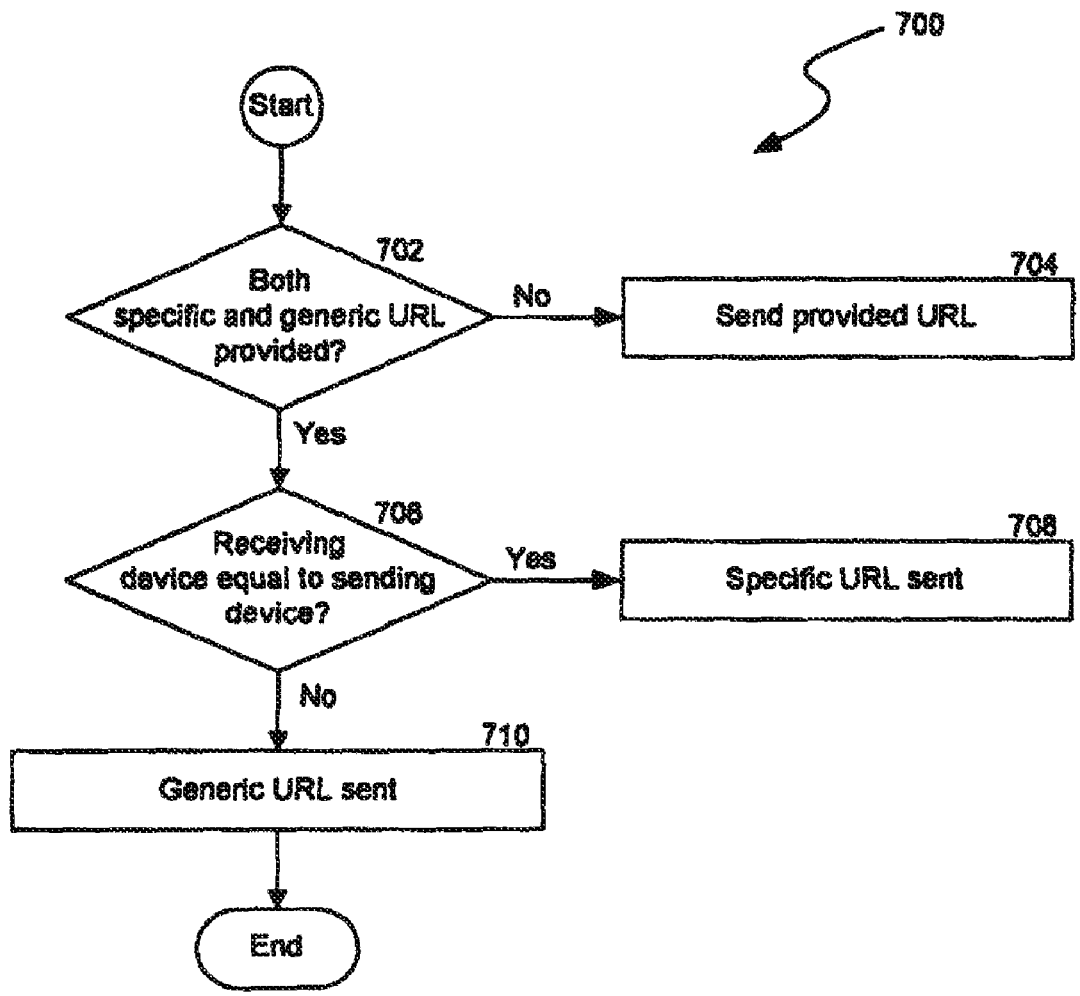
FIG. 7 is a flow diagram showing an alternative routine for handling differences in user devices.

FIG. 7 illustrates a device compatibility routine 700, as provided under an alternate embodiment to that of FIG. 6. The routine of FIG. 7 assumes that the share content application has access to information pertaining to the recipient device, including the type of wireless service to which the device subscribes. This information may be obtained internally, from inside the system, or externally, such as in the case of a cross-carrier recipient device.

At decision block 702, the share content application checks if the share content request contains both a specific url parameter (surl) and a general url parameter (url). If the share content request does not contain both parameters, the routine 700 continues at block 704, where the share content application generates a share content message containing the single provided url parameter. If, however, the share content request contains both a specific url and a generic url, the routine 700 continues at decision block 706.

At decision block 706, the share content application checks whether the recipient device and the sending device have equal or compatible capabilities. If both devices subscribe to the wireless service provider (carrier) associated with the share content application, this may be done by checking one or more local databases containing device information. If the recipient device subscribes to an outside service provider, the check may involve using a cross-carrier service, such as the cross-carrier service application 132 of FIG. 1, to obtain the relevant data. If at decision block 706, the recipient device and the sending device have equal or compatible capabilities, the routine 700 continues at block 708, where the share content application sends the specific url. If, however, at decision block 706 the share recipient device and the sending device do not have equal or compatible capabilities, the routine continues at block 710, where the share content application sends the generic url.

Figure 8:
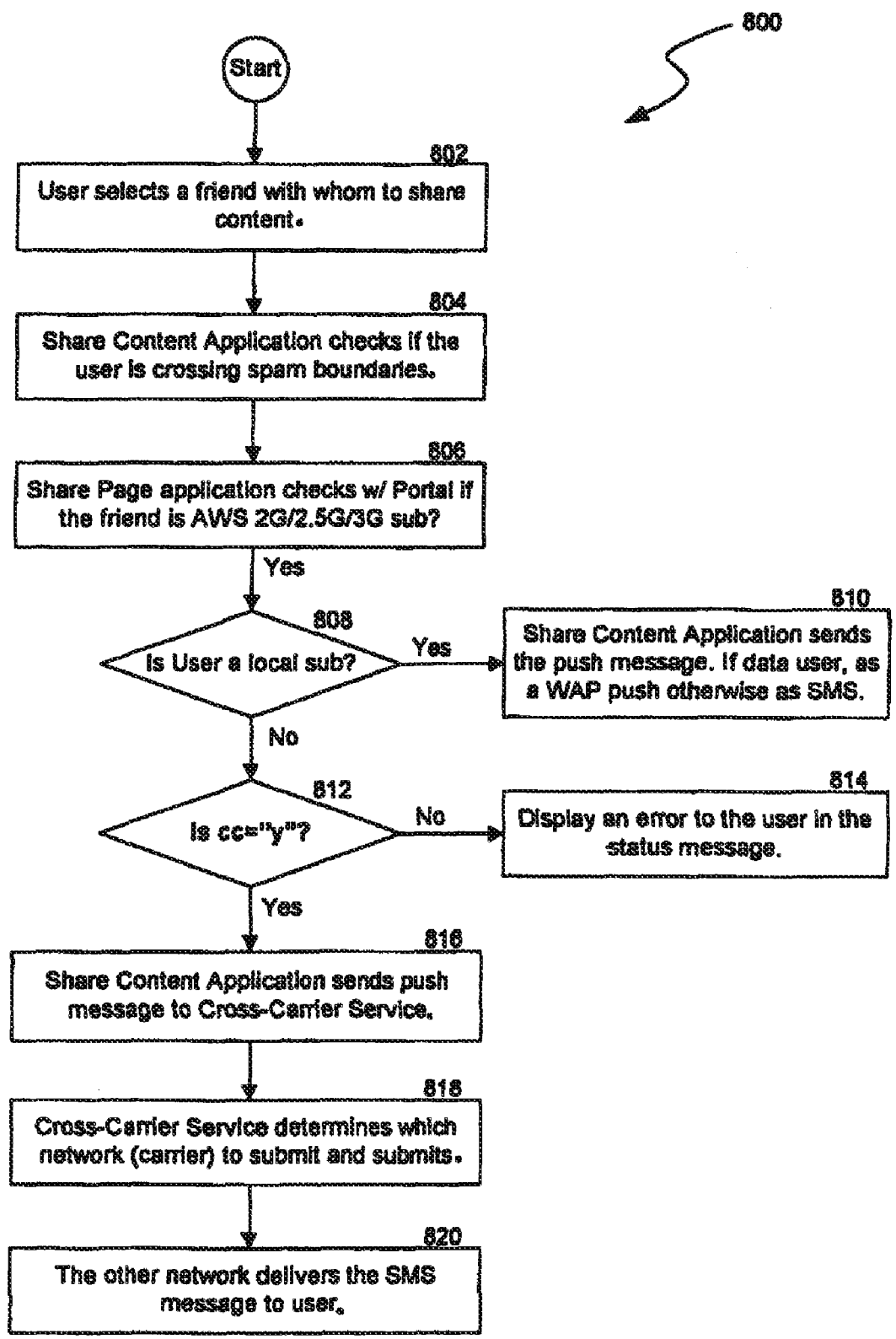
FIG. 8 is a flow diagram showing a more detailed routine for handling cross-carrier recipients.

Referring to FIG. 8, and as described briefly with respect to FIGS. 6 and 7, share content messages may not only be sent among devices with different capabilities but also among devices that subscribe to different mobile service providers. When the share content application receives a share content message request where the recipient is a cross-carrier recipient, the share content application may perform a routine 800 in conjunction with a cross-carrier service, such as the cross-carrier service 132 of FIG. 1. At block 802, the user selects a friend with whom to share content (e.g., using recipient information form). At block 804, the share content application checks if the user is crossing spam boundaries (e.g., see U.S. patent application Ser. No. 10/822,187, now U.S. Pat. No. 7,295,833 (incorporated herein by reference). At block 806, the share content application checks local databases to determine whether the specified recipient is a subscriber to the associated wireless service provider, and to determine whether the recipient device subscribes to a sufficiently advanced wireless service (e.g., a 2.5G cellular network employing technology such as GPRS).

At decision block 808, if the recipient device subscribes to the associated wireless service provider, the routine 800 continues at block 810, where the share content application generates and sends a share content message to the recipient device. If the recipient device is configured to use data, the sent message may be a WAP Push message. Otherwise, the message may be an SMS message. If, however, at decision block 808 the recipient device does not subscribe to the associated wireless service provider, the routine 800 continues at decision block 812.

At decision block 812, the routine checks the cc parameter of the share content request message. If the share content request message includes a cc parameter that is not affirmatively set, the routine 800 continues a block 814, where the share content application sends a display description of an error message to the sender device. If, however, at decision block 812, the share content request message includes a cc parameter that is affirmatively set, the routine 800 continues at block 816.

At block 816 the share content application generates a share content message (e.g., SMS message) and sends it to the cross-carrier service. At block 818, the cross-carrier service determines an appropriate network for passing on the message and sends the message using this network. At block 820, the appropriate network delivers the message to the user.

Figure 9:
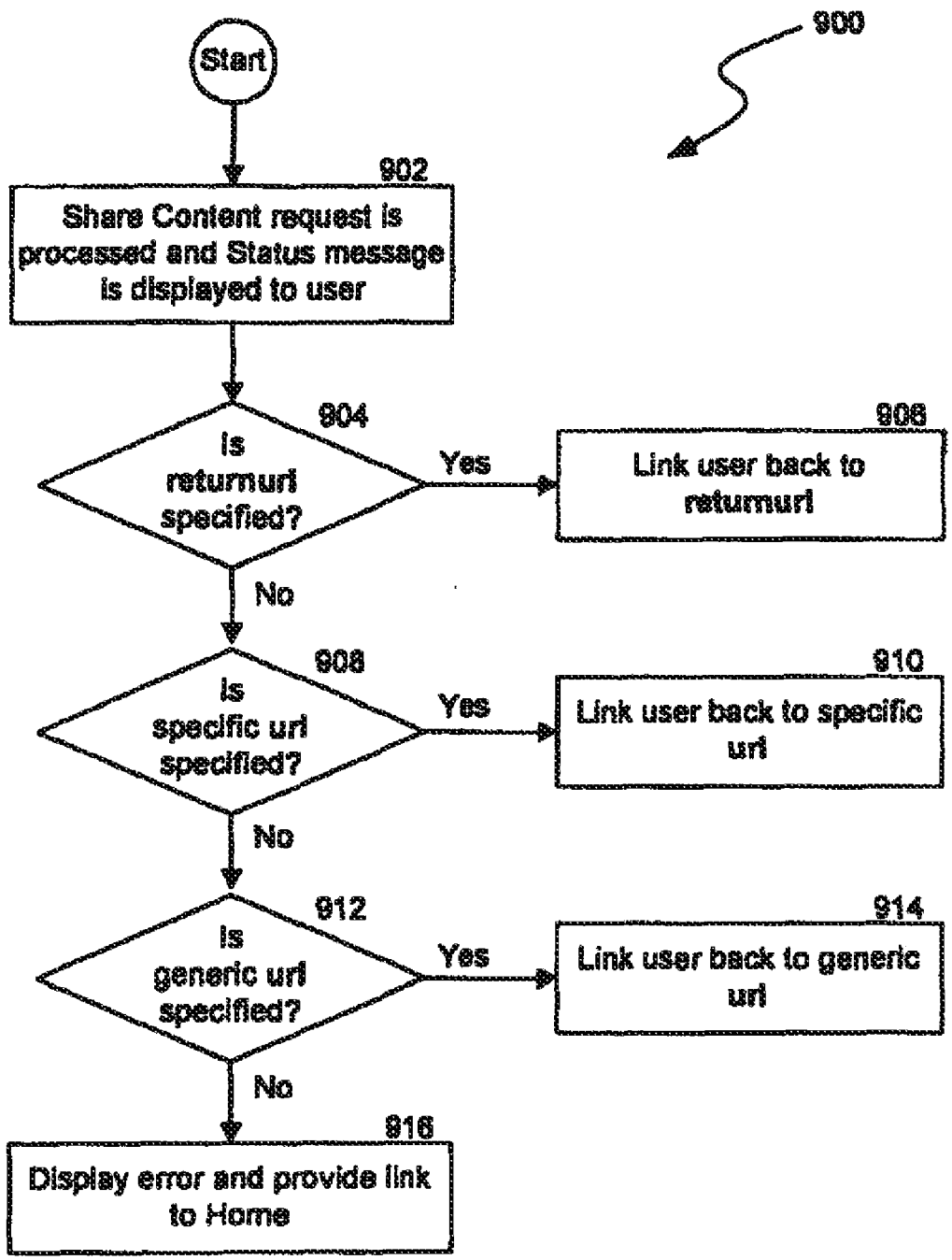
FIG. 9 is a flow diagram showing a routine for returning a user back to a content page from which the user requested to share content.

Referring to FIG. 9, when provided with a return url parameter, a routine 900 at the share content application may facilitate returning the user to the content screen from which the user made the initial share content request, once the share content process has been completed. Alternatively, the user may be linked to a return page specifically selected by the content provider. At block 902, the share content request is processed and a status request message is displayed to the user. At decision block 904, the routine 900 checks whether the initial share content request includes a return url parameter. If at decision block 904 the share content request includes a return url parameter, the routine 900 continues at block 906, where the routine links the user back to the content identified by the return url parameter, and the routine ends. If, however, at decision block 904 the initial share content request does not include a return url parameter, the routine 900 continues at decision block 908.

At decision block 908 the routine 900 checks whether the initial share content request includes a specific url parameter. If at decision block 908 the share content request includes a specific url parameter, the routine 900 continues at block 910, where the routine links the user back to the content specified by the specific url, and the routine ends. If, however, at decision block 908 the share content request does not include a specific url parameter, the routine 900 continues at decision block 912.

At decision block 912, if a generic url is specified, the routine 900 continues at block 914, where the routine links the user back to the content identified by the generic url parameter, and the routine ends. If however, at decision block 912 the share content request does not include a generic url parameter, the routine 900 continues at block 916, where the routine displays an error message to the user and provides a link to a wireless portal home page associated with the share content application.

V. User Interface

As described in the flow charts above, the content sharing system may include various user screens, views, and other interfaces that allow users to share content, view spam control limitations, and define privacy settings. Examples of such screens are described with respect to FIGS. 8 through 12. While only certain examples are given, a person skilled in the art will appreciate that many other interfaces could be implemented without departing from the scope of the invention. The terms "screen," "window," and "page" are generally used interchangeably herein. The pages described herein may be implemented using, for example, WML (wireless markup language), XHTML (extensible hypertext markup language), XML (extensible markup language), or HTML (hypertext markup language). In some embodiments, WML and XHTML decks offer similar functionality but may differ with respect to style guide and design requirements between the two languages (use of color, icons, etc.). The look and feel of WML pages are primarily text-based, with underlining used to highlight clickable links. XHTML is a richer development language, allowing the mobile device to present content that may stand out on many different levels. For example, XHTML may allow the use of front and background colors, bolding, and icons.

The screens or web pages provide facilities to receive input data, such as a form with fields to be filled in, pull-down menus or entries allowing one or more of several options to be selected, such as buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein. The pages or screens are stored and/or transmitted as display descriptions, as graphical user interfaces, or by other methods of depicting information on a screen (whether personal computer, PDA, mobile telephone or other) where the layout and information or content to be displayed on the page is stored in memory, a database, or other storage facility.

When implemented as web pages or wireless content, the screens are stored as display descriptions, graphical user interfaces, or other methods of depicting information on a computer screen (e.g., commands, links, fonts, colors, layout, sizes and relative positions, and the like) where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

In general, for ease in describing features of the invention, aspects of the invention will now be described in terms of a user interacting with the share content application server computer via his or her user computer or mobile device. As implemented, however, the user computer receives data input by the user and transmits such input data to the server computer. The server computer then queries the database, retrieves requested pages, performs computations, and/or provides output data back to the user computer, typically for visual display to the user.

Figure 10:
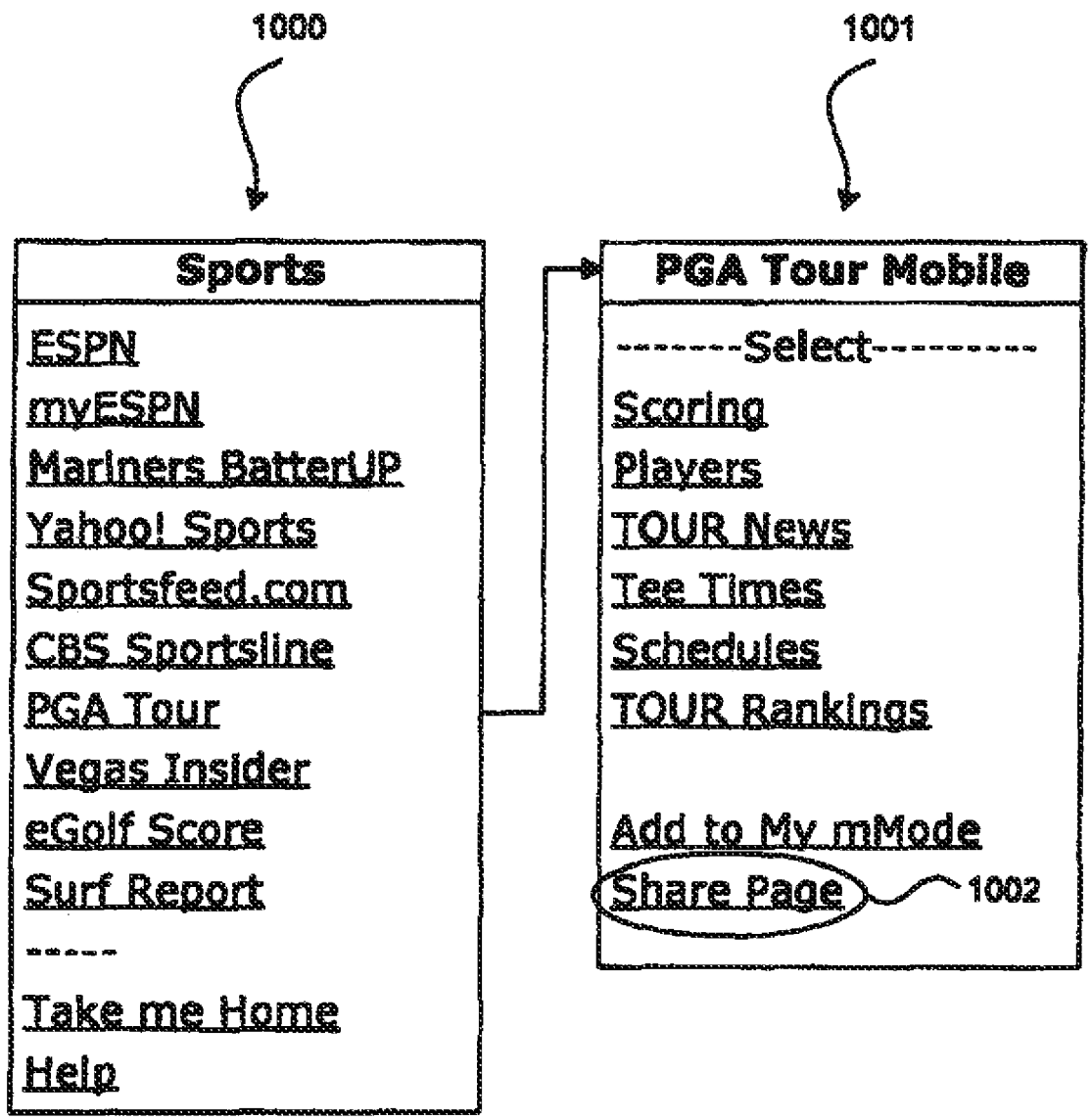
FIG. 10 is a display diagram showing screens from which a user of the content sender device of FIG. 1 (e.g., a WAP-enabled device) may select content to share.

Referring to FIG. 10, a user of a content sender device 116 starts at a content screen 1000 listing various links in this example, and proceeds, via a selected link, to a "PGA Tour" screen 1001 especially configured for mobile devices. By selecting a Share Page link 1002 at the bottom of the PGA Tour screen 1001, the user can initiate the process of sending the content (e.g., the PGA Tour screen 1001) to one or more friends.

Figure 11:
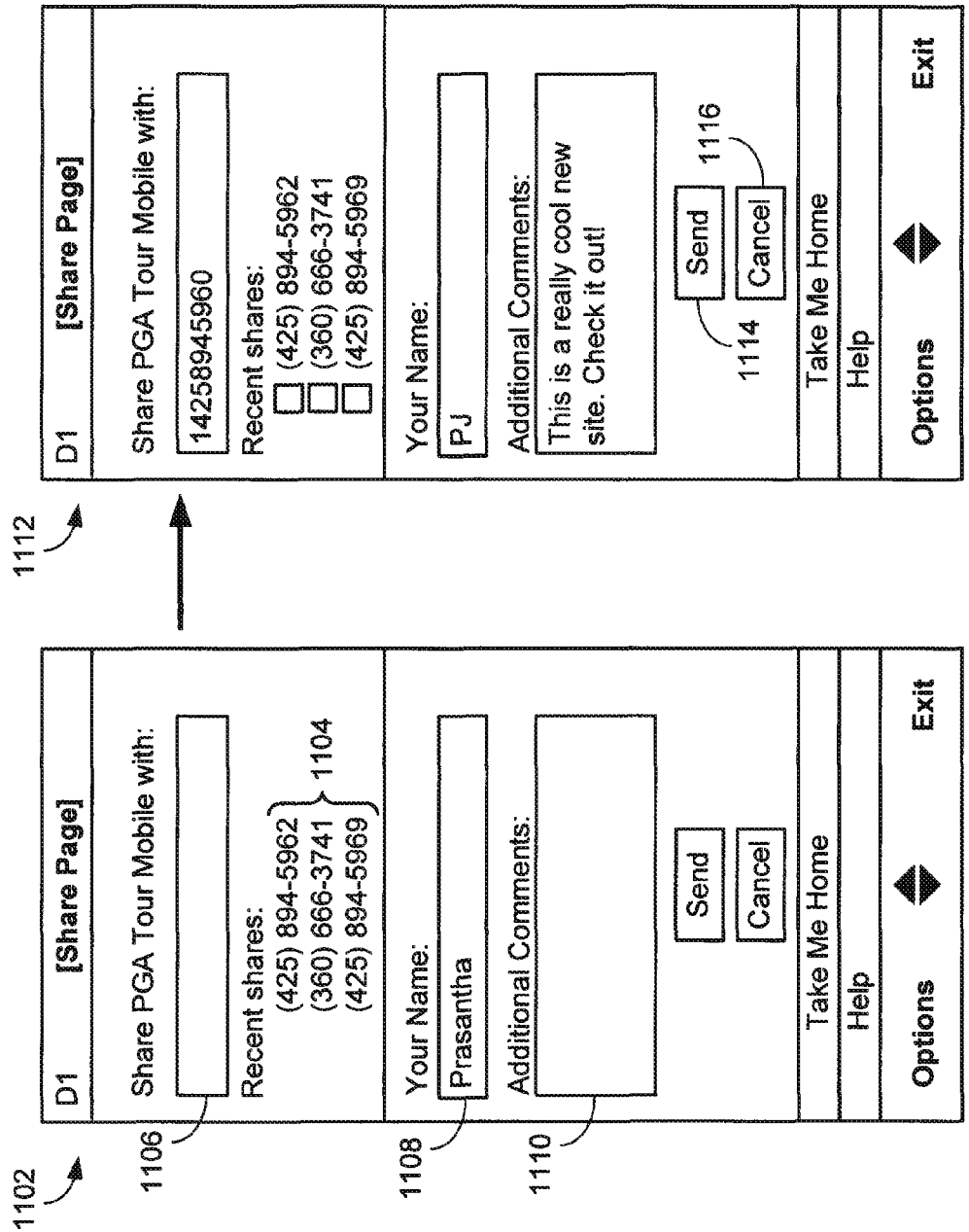
FIG. 11 is a display diagram showing input forms sent to a user of the content sender device of FIG. 1, so that the user may specify recipients with whom to share content.

Referring to FIG. 11, the content sender device 116 displays an example of an input form 1102 as would be shown on a screen of a mobile device. The input form 1102 allows the user to provide information so that the user can share the content with others. The content sender device 116 displays this form 1102 after the user selects the Share Page link 1002 of FIG. 10, causing the content provider 102 to send an HTTP GET request to the user's mobile service provider, as described above. The input form 1102 includes several fields designed to provide information or to allow the user to provide information. For example, a list of "recent shares" 1104 may be displayed under the assumption that the user would like to share content with the same people the user has shared content with in the past. The form 1102 may also include a field 1106 for the user to provide the name or phone number (MSISID) of another person. The form may include a name field 1108 pre-filled with the user's name, as well as a text box 1110 for the user to type a message. As shown in screen 1112, the user may update the name field 1108 as desired. While not shown in the illustrated example, in some embodiments, the user may identify more than one person with whom to share the content.

The screen 1112 shows the form as it may appear after the user has completed it by filling in the various fields. At this point, the user may submit the form to the share content application 104 by selecting a send button 1114 or may cancel the process by selecting a cancel button 1116.

Figure 12:
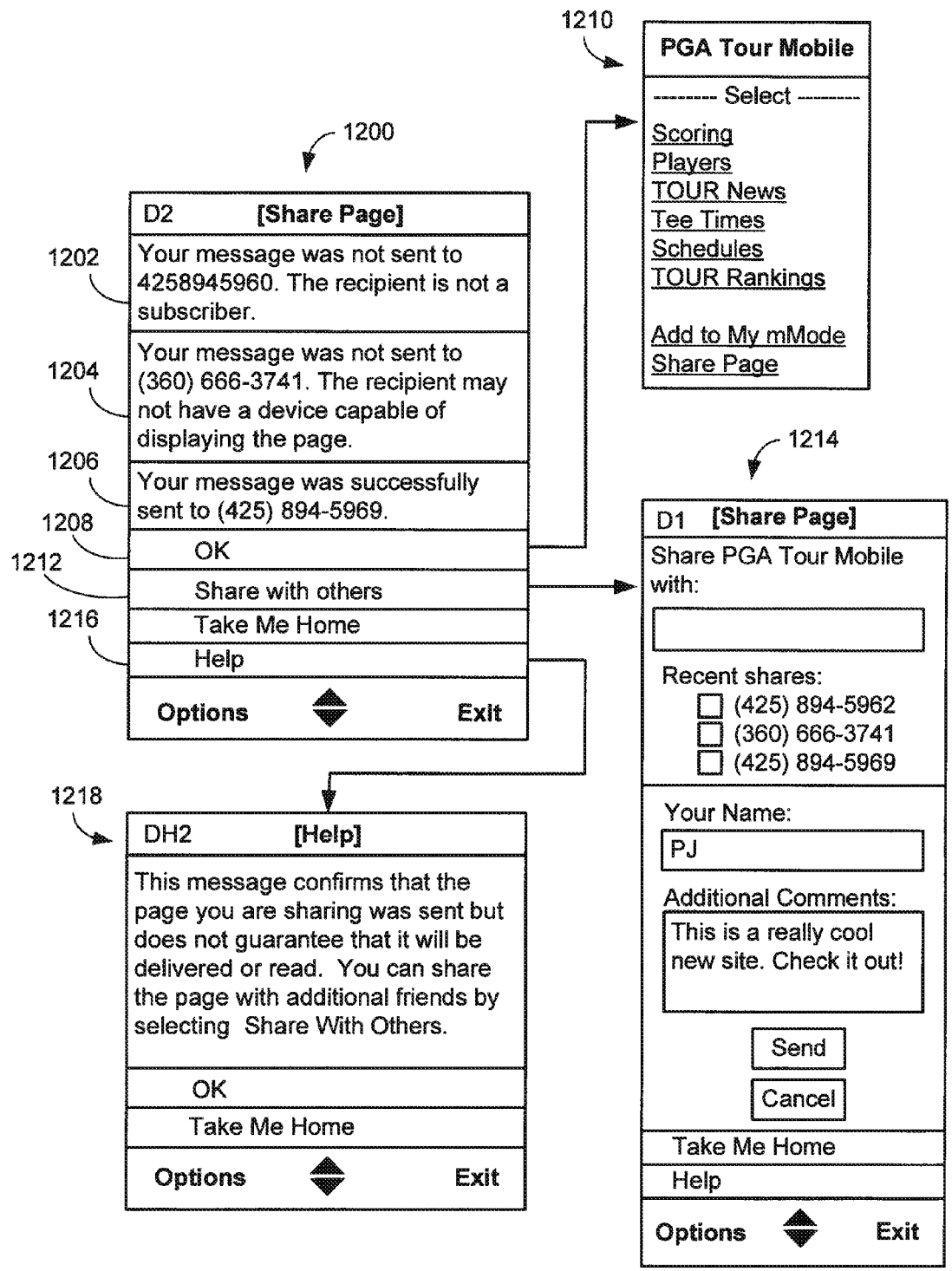
FIG. 12 is a display diagram showing various messages for the user of the content sender device of FIG. 1, so that the user may determine the outcome of the request to share and request other services.

Referring to FIG. 12, a display diagram/flow depicts various messages and results that a user may receive on the content sender device 116 after the user has submitted an input form, such as the input form 1102. In a screen 1200, the device displays three messages each corresponding to a contact with whom the user attempted to share content. A message 1202 indicates that the content was not sent to one of the desired recipients because that recipient was not a subscriber to the wireless carrier to which the user subscribes. This type of message 1202 is only displayed in systems that do not support cross-carrier content sharing. A second message 1204 indicates that the content was not sent to one of the desired recipients because that recipient did not have a device capable of displaying the content. A third message 1206 indicates that the content was successfully sent to one of the desired recipients.

From the screen 1200, the user can select an OK button 1208 to return to a screen 1210 showing the content that the user initially intended to share. Alternatively, the user may select a Share With Others button 1212 to return an input form screen 1214 from which the user can identify additional users with whom to share the content, similar to the input form 1102 of FIG. 11. The user may also select a Help button 1216 to view a help screen 1218 that shows additional information about the sharing process that the user may find helpful.

Figure 14:
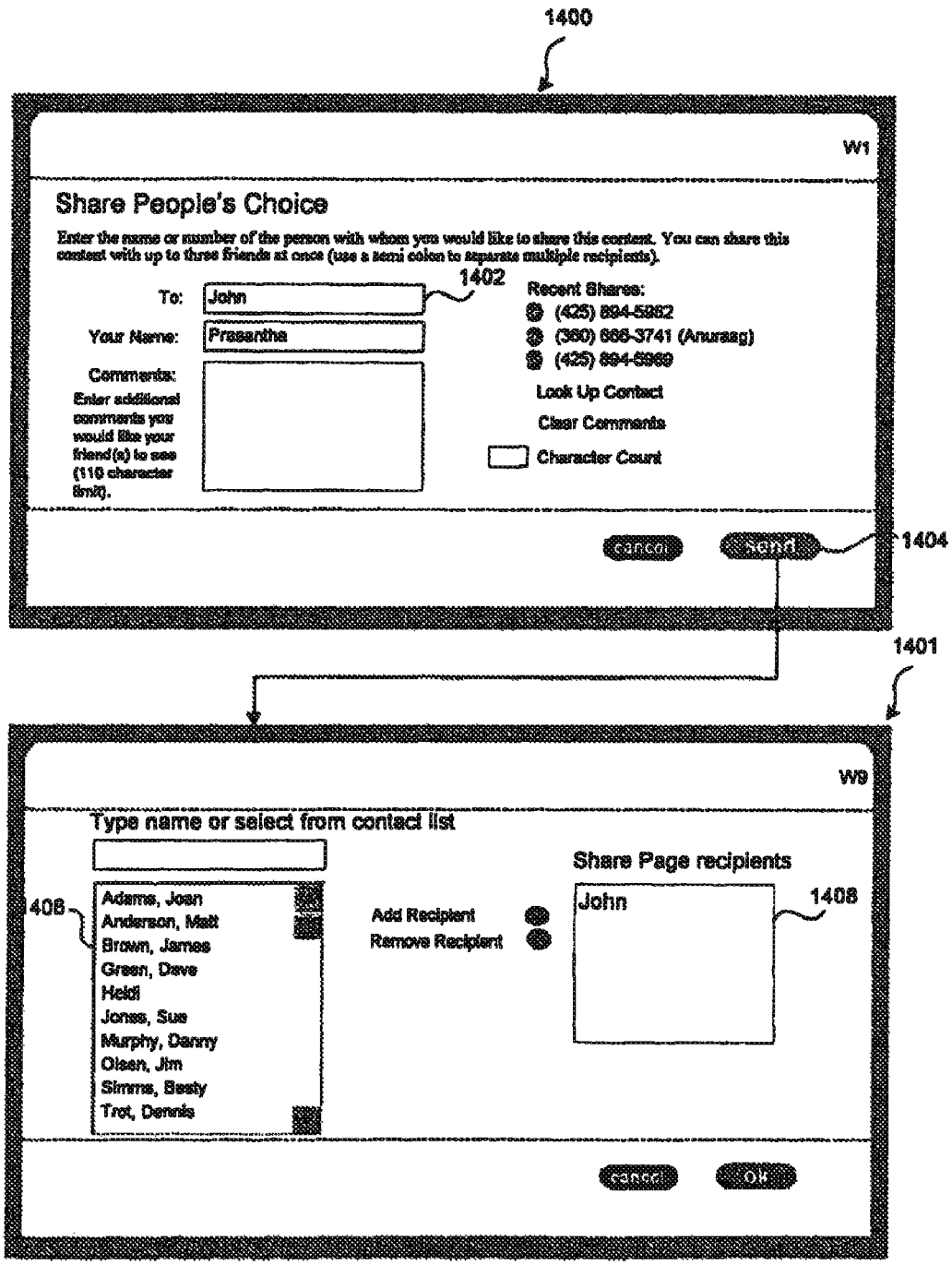
FIG. 14 is a display and flow diagram showing screens displayed on the full-size screen of the computer device from which a user may specify recipients with whom to share content.

Referring to FIGS. 13 and 14, in some embodiments, the user can use a PC, laptop, or similar device to share content. This configuration will generally offer the same functionality as when a mobile or similar device is used. For example, from a content screen 1300 of FIG. 13, the user will be able to select a share link 1302. The user may then be taken to an input form, such as the input form 1400 of FIG. 14. Like the input form 1102 displayed on the mobile device screen, this input form allows the user to provide information so that the user can share the content with others. Because the screens on such devices may be larger and the devices themselves may have more capabilities (especially I/O capabilities), a user sending content from PCs and laptops may experience added features. In addition, the differences in "look and feel" because the techniques for connecting to the share content application may vary depending on the type of device used, other differences may be present in the experience of the PC user, as opposed to the wireless user.

FIG. 14 also shows an address list lookup performed by an address book application. While not illustrated, this address book lookup may also be available to users of mobile devices. When using the address book lookup feature, the user begins at the input screen 1400 and enters a name (e.g., John) into a field 1402. When the user select the send button 1404, the user can then view a list of names 1406, as shown on an address lookup screen 1401. From this list of names 1406, the user can add or remove a recipient from a list of recipients 1408.

VI. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps or employ systems having blocks in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or at different times. Where the context permits, words in the above Detailed Description using the singular or plural number may also include the plural or singular number, respectively, where the context permits.

The teachings of the invention provided herein can be applied to other systems, not necessarily only the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the content sharing system and spam control and privacy management techniques may vary considerably in their implementation details, while still being encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method comprising:
   presenting content on a first device, the content comprising a share content link;
   detecting a selection of the share content link on the first device;
   responsive to detecting the selection of the share content link, generating on the first device a share content request comprising a specific resource locator, a generic resource locator,
      wherein the specific resource locator identifies a device-dependent portion of the content, wherein the device-dependent portion of the content is configured for a specific class of device, and wherein the generic resource locator identifies a non-device-dependent portion of the content, wherein the non-device-dependent portion of the content is configured for multiple devices, wherein each of the multiple devices belong to a distinct class;

transmitting the share content request from the first device to a content sharing system;

receiving on the first device a user input form;

detecting user input form data on the first device comprising at least one second device identifier;

transmitting the user input form data to the content sharing system;

receiving a status message from the content sharing system at the first device, wherein the status message comprises a return uniform resource locator and an indication of whether the content was successfully shared with a second device; and automatically presenting content associated with the return uniform resource locator.

2. The method of claim 1, wherein the share content request is an HTTP GET request.

3. The method of claim 1, wherein receiving the user input form comprises receiving at least one address book entry.

4. The method of claim 3, wherein detecting the user input form data comprising the at least one second device identifier comprises detecting a selection of the at least one address book entry.

5. The method of claim 1, wherein receiving the user input form comprises receiving at least one recently shared device identifier, wherein the at least one recently shared device identifier is associated with a device for which the first device has generated a previous share content request.

6. The method of claim 5, wherein detecting the user input form data comprising the at least one recipient identifier comprises detecting a selection of the at least one recently shared device identifier.

7. The method of claim 1, wherein the share content request further comprises a cross-carrier indicator, wherein the cross-carrier indicator indicates whether the content is to be shared with a cross-carrier second device.

8. A wireless device comprising:
a transceiver configured to:
receive content,
transmit a share content request to a content sharing system,
receive a user input form,
transmit user input form data to the content sharing system, and
receive a status message from the content sharing system, wherein the status message comprises a return uniform resource locator and an indication of whether the content was successfully shared with a recipient device; and
a processor configured to:
present the content comprising a share content link,
detect a selection of the share content link,
responsive to detecting the selection of the share content link, generate the share content request comprising a specific resource locator and a generic resource locator,
wherein the specific resource locator identifies a device-dependent portion of the content, wherein the device-dependent portion of the content is configured for a specific class of device, and
wherein the generic resource locator identifies a non-device-dependent portion of the content, wherein the non-device-dependent portion of the content is configured for multiple devices, wherein each of the multiple devices belong to a distinct class,
present the user input form,
detect the user input form data comprising at least one recipient device identifier,
present the status message; and
automatically present content associated with the return uniform resource locator.

9. The wireless device of claim 8, wherein the share content request is an HTTP GET request.

10. The wireless device of claim 8, wherein the user input form comprises at least one address book entry.

11. The wireless device of claim 10, wherein the processor configured to detect the user input form data comprises the processor configured to detect a selection of the at least one address book entry.

12. The wireless device of claim 8, wherein the user input form comprises at least one recently shared device identifier, wherein the at least one recently shared device identifier is associated with a device for which the wireless device has generated a previous share content request.

13. The wireless device of claim 12, wherein the processor configured to detect the user input form data comprises the processor configured to detect a selection of the at least one recently shared device identifier.

14. The wireless device of claim 8, wherein the share content request further comprises a cross-carrier indicator, wherein the cross-carrier indicator indicates whether the content is to be shared with a cross-carrier recipient device.

15. A non-transitory computer-readable device comprising instructions for:
presenting content on a user device, the content comprising a share content link;
detecting a selection of the share content link on the user device;
responsive to detecting the selection of the share content link, generating on the user device a share content request comprising a specific resource locator and a generic resource locator,
wherein the specific resource locator identifies a device-dependent portion of the content, wherein the device-dependent portion of the content is configured for a specific class of device, and
wherein the generic resource locator identifies a non-device-dependent portion of the content, wherein the non-device-dependent portion of the content is configured for multiple devices, wherein each of the multiple devices belong to a distinct class;
transmitting the share content request from the user device to a content sharing system;
receiving on the user device a user input form;
detecting user input form data on the user device comprising at least one recipient device identifier;
transmitting the user input form data to the content sharing system;
receiving a status message from the content sharing system at the user device, wherein the status message comprises a return uniform resource locator and an indication of whether the content was successfully shared with a recipient device; and
automatically presenting content associated with the return uniform resource locator.

16. The non-transitory computer-readable device of claim 15, wherein the share content request is an HTTP GET request.

17. The non-transitory computer-readable device of claim 15, wherein the instructions for receiving the user input form comprise instructions for receiving at least one address book entry.

18. The non-transitory computer-readable device of claim 17, wherein the instructions for detecting the user input form data comprising the at least one recipient device identifier comprise instructions for detecting a selection of the at least one address book entry.

19. The non-transitory computer-readable device of claim 15, wherein the instructions for receiving the user input form comprises instructions for receiving at least one recently shared device identifier, wherein the at least one recently shared device identifier is associated with a device for which the user device has generated a previous share content request.

20. The non-transitory computer-readable device of claim 19, wherein the instructions for detecting the user input form data comprising the at least one recipient identifier comprise instructions for detecting a selection of the at least one recently shared device identifier.

21. The non-transitory computer-readable device of claim 15, wherein the share content request further comprises a cross-carrier indicator, wherein the cross-carrier indicator indicates whether the content is to be shared with a cross-carrier recipient device.

* * * * *